(12) United States Patent
Palankar

(10) Patent No.: US 10,425,485 B2
(45) Date of Patent: Sep. 24, 2019

(54) INTEGRATING INFORMATION CENTRIC NETWORKING (ICN) OVER LOW POWER AND LOSSY NETWORKS (LLNS)

(71) Applicant: Cisco Technology, Inc., San Jose, CA (US)

(72) Inventor: Ganesh Prasad Narayan Palankar, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 187 days.

(21) Appl. No.: 15/357,043

(22) Filed: Nov. 21, 2016

(65) Prior Publication Data

US 2018/0145876 A1 May 24, 2018

(51) Int. Cl.
*H04L 12/24* (2006.01)
*H04L 29/08* (2006.01)
*H04B 3/54* (2006.01)

(52) U.S. Cl.
CPC ........... *H04L 67/1097* (2013.01); *H04B 3/54* (2013.01); *H04L 67/2842* (2013.01); *H04L 67/02* (2013.01)

(58) Field of Classification Search
CPC ..... H04N 5/2256; H04N 5/232; H04W 40/36; G06F 15/16; G06T 3/4007
USPC .......................... 709/214, 223, 245; 370/235
See application file for complete search history.

(56) References Cited

U.S. PATENT DOCUMENTS

| | | | |
|---|---|---|---|
| 9,314,458 B2 * | 4/2016 | Aylward | A61K 31/22 |
| 2003/0166613 A1 * | 9/2003 | Aylward | A61K 31/22 514/63 |
| 2014/0198712 A1 | 7/2014 | Howard | |
| 2014/0269402 A1 | 9/2014 | Vasseur et al. | |
| 2015/0016257 A1 * | 1/2015 | Kumar | H04L 47/16 370/235 |
| 2015/0182588 A1 * | 7/2015 | Kahvejian | A61K 47/6901 424/1.69 |
| 2015/0281071 A1 * | 10/2015 | Mosko | H04L 45/745 709/223 |
| 2015/0381557 A1 * | 12/2015 | Fan | H04L 61/10 709/245 |

(Continued)

OTHER PUBLICATIONS

Barakabitze et al., "Caching and Data Routing in Information Centric Networking (ICN): The Future Internet Perspective", Nov. 2014, ISSN: 2277 128X, vol. 4; Issue: 11, pp. No. 08-20; International Journal of Advanced Research in Computer Science and Software Engineering.

(Continued)

*Primary Examiner* — Tesfay Yohannes
(74) *Attorney, Agent, or Firm* — Behmke Innovation Group, LLC; James Behmke; Stephen D. LeBarron

(57) ABSTRACT

In one embodiment, a device in a network joins an Information Centric Networking (ICN)-based directed acyclic graph (DAG) based on the device being able to act as an ICN cache in the network. The device receives ICN content data for forwarding between a content provider node in the network and a destination node in the network. The device forwards the ICN content data towards the destination node in the network. The device coordinates, with one or more other members of the ICN-based DAG, caching of the ICN content data by the device or by one of other members of the ICN-based DAG.

18 Claims, 15 Drawing Sheets

(56) References Cited

U.S. PATENT DOCUMENTS

| | | | |
|---|---|---|---|
| 2016/0087881 A1* | 3/2016 | Ge | H04L 45/42 709/244 |
| 2016/0173604 A1 | 6/2016 | Panigrahi et al. | |
| 2016/0330497 A1* | 11/2016 | VanAntwerp | H04N 21/2665 |
| 2017/0272326 A1* | 9/2017 | Ravindran | H04L 41/12 |
| 2018/0135012 A1* | 5/2018 | Mata-Fink | C12N 5/0644 |

OTHER PUBLICATIONS

Abani, Noor., "Caching in Information-Centric Networks", http://www.ime.unicamp.br/, 5 pages, Web Page Accessed on Aug. 18, 2016.

Chai et al., "Cache "less for more" in information-centric networks.", Proceedings of the 11th international IFIP TC 6 conference on Networking—vol. Part I (IFIP'12), pp. 27-40, Berlin, Heidelberg, Springer-Verlag.

Eum et al., "CATT: potential based routing with content caching for ICN", In Proceedings of the second edition of the ICN workshop on Information-centric networking (ICN '12), New York, NY, 2012, pp. 49-54, ACM.

Fayazbakhsh et al., "Less pain, most of the gain: incrementally deployable ICN", SIGCOMM Comput. Commun. Rev. 43, 4 (Aug. 2013), 2013, pp. 147-158, New York, NY, ACM.

Zhang et al., "Requirements and Challenges for IoT over ICN", Internet-Draft,<draft-zhang-icnrg-icniot-requirements-01>, Apr. 22, 2016, 39 pages, Internet Engineering Task Force Trust.

Li et al., "Caching Policies for In-Network Caching", 2012 21st International Conference on Computer Communications and Networks (ICCCN), pp. 1-7, 2012 21st International Conference on Computer Communications and Networks (ICCCN), Munich, 2012.

Baccelli et al., "Information centric networking in the IoT: experiments with NDN in the wild.", Proceedings of the 1st international conference on Information-centric networking (ICN '14), pp. 77-86, New York, NY, ACM.

* cited by examiner

US 10,425,485 B2

INTEGRATING INFORMATION CENTRIC NETWORKING (ICN) OVER LOW POWER AND LOSSY NETWORKS (LLNS)

TECHNICAL FIELD

The present disclosure relates generally to computer networks, and, more particularly, to integrating Information Centric Networking (ICN) over Low Power and Lossy Networks (LLNs).

BACKGROUND

Low Power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

In contrast to many traditional computer networks, LLN devices typically communicate via shared-media links. For example, LLN devices that communicate wirelessly may communicate using overlapping wireless channels (e.g., frequencies). In other cases, LLN devices may communicate with one another using shared power line communication (PLC) links. For example, in a Smart Grid deployment, an electric utility may distribute power to various physical locations. At each location may be a smart meter that communicates wirelessly and/or using the electrical power distribution line itself as a communication medium.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
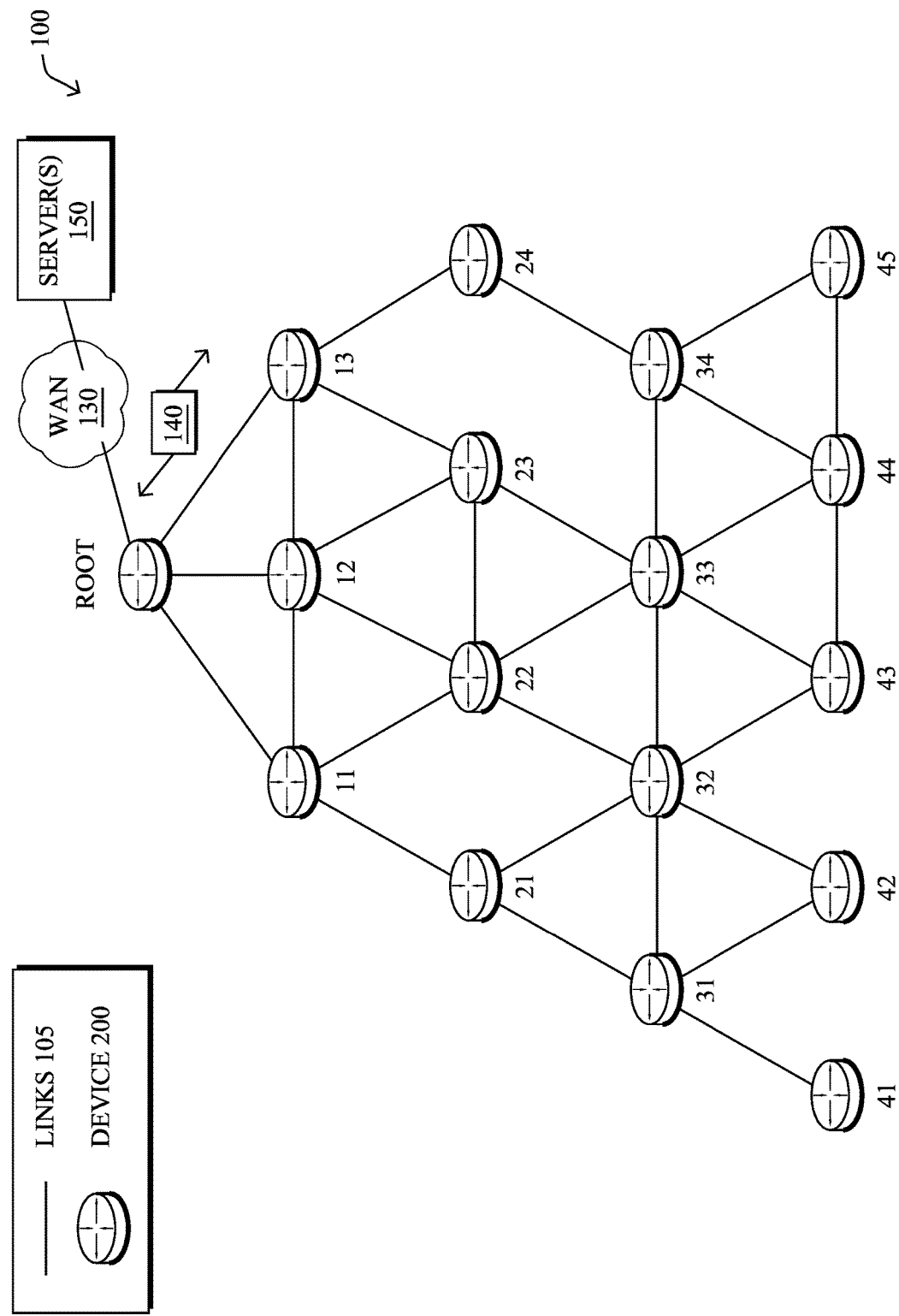
FIG. 1 illustrates an example communication network.

According to one or more embodiments of the disclosure, a device in a network joins an Information Centric Networking (ICN)-based directed acyclic graph (DAG) based on the device being able to act as an ICN cache in the network. The device receives ICN content data for forwarding between a content provider node in the network and a destination node in the network. The device forwards the ICN content data towards the destination node in the network. The device coordinates, with one or more other members of the ICN-based DAG, caching of the ICN content data by the device or by one of other members of the ICN-based DAG.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. The illustrative Root node, such as a field area router (FAR), may interconnect the local networks with a WAN 130, which may enable communication with other relevant devices such as management devices or servers 150, e.g., a network management server (NMS), a dynamic host configuration protocol (DHCP) server, a constrained application protocol (CoAP) server, an outage management system (OMS), a supervisory control and data acquisition (SCADA) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
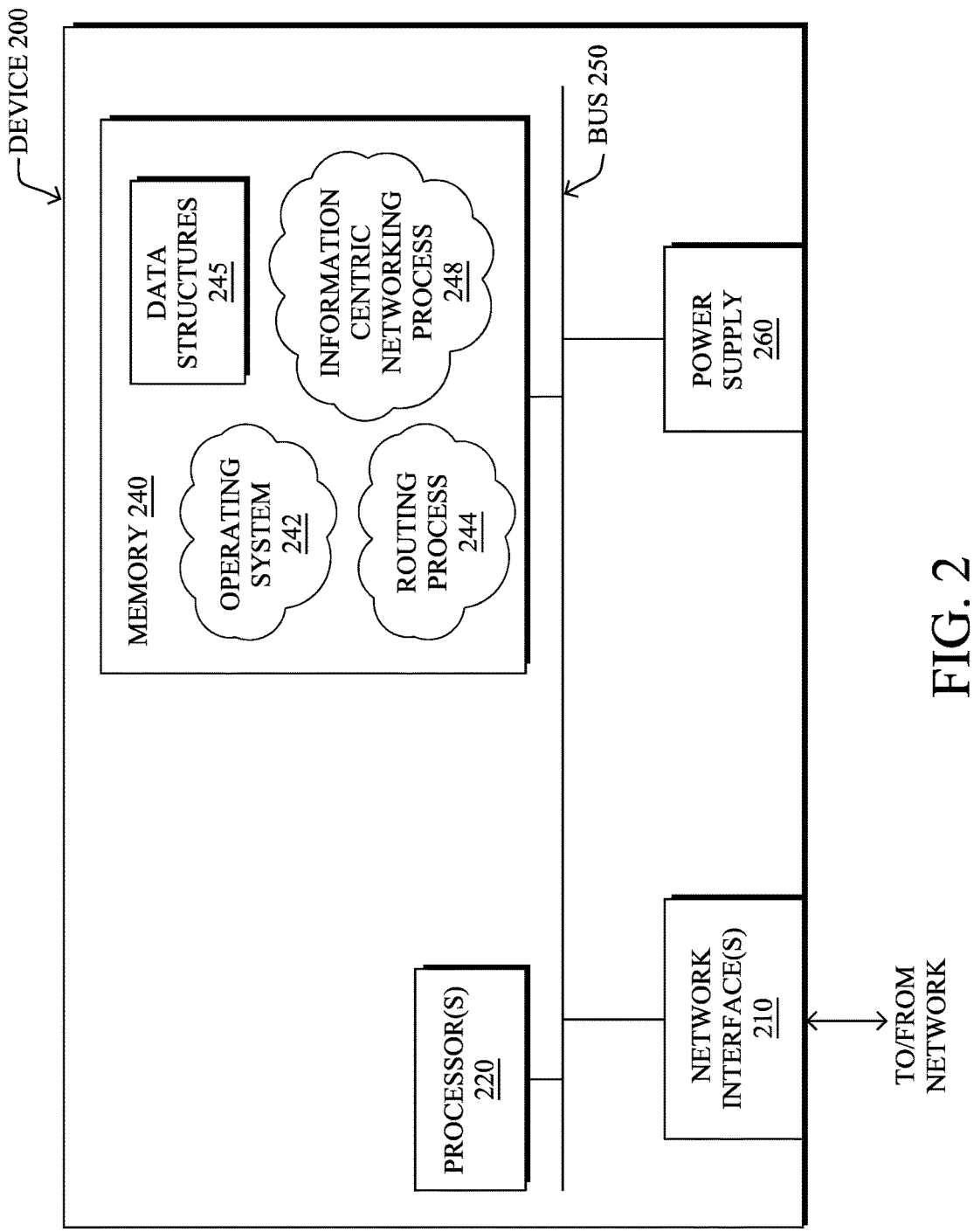
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative Information Centric Networking (ICN) process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low Power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are is characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by a DAG process) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks" <RFC 6551> by Vasseur, et al. (March 2012 version). Further, an example OF (e.g., a default OF) may be found in an IETF RFC, entitled "RPL Objective Function 0" <RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
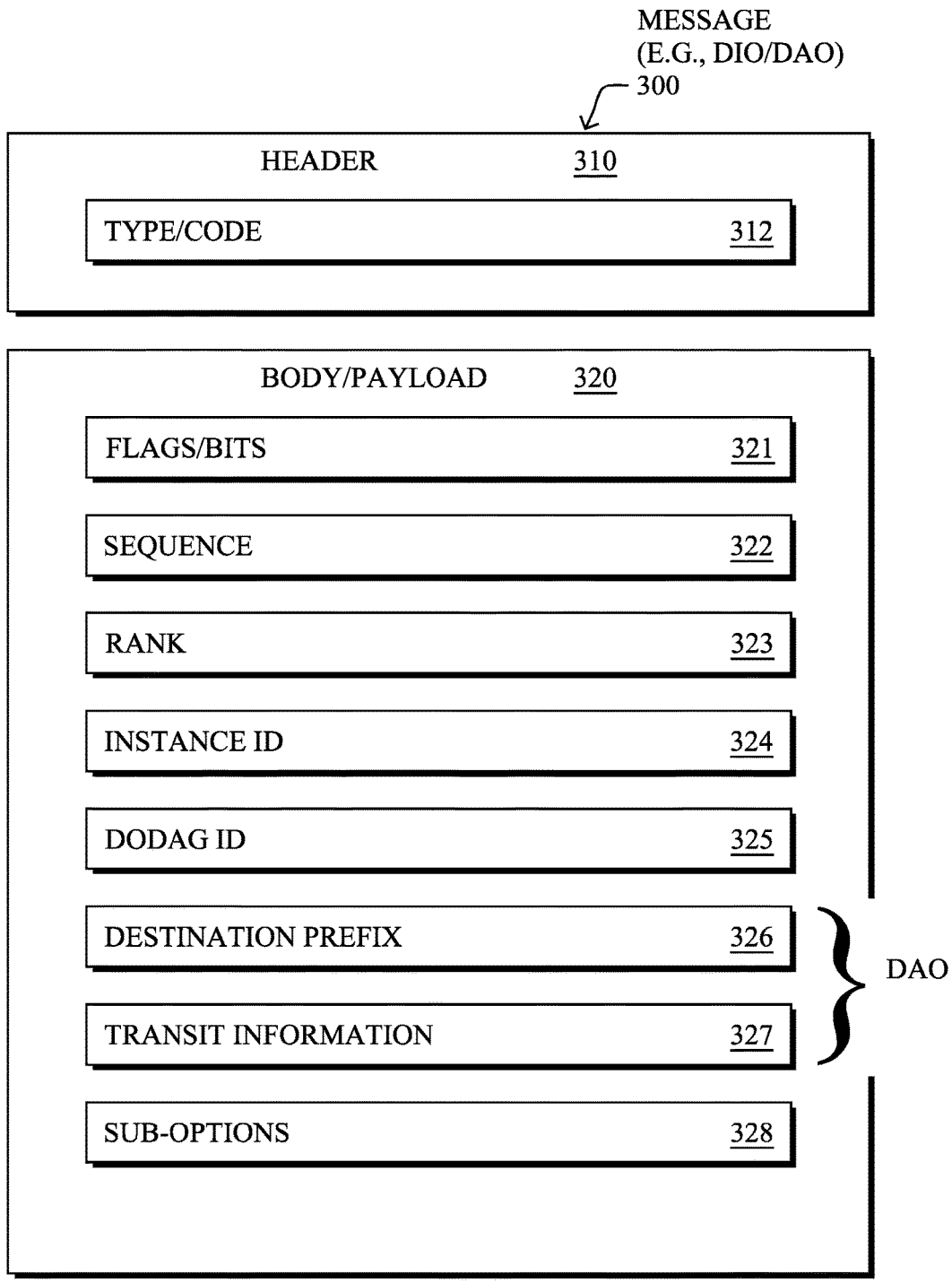
FIG. 3 illustrates an example message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
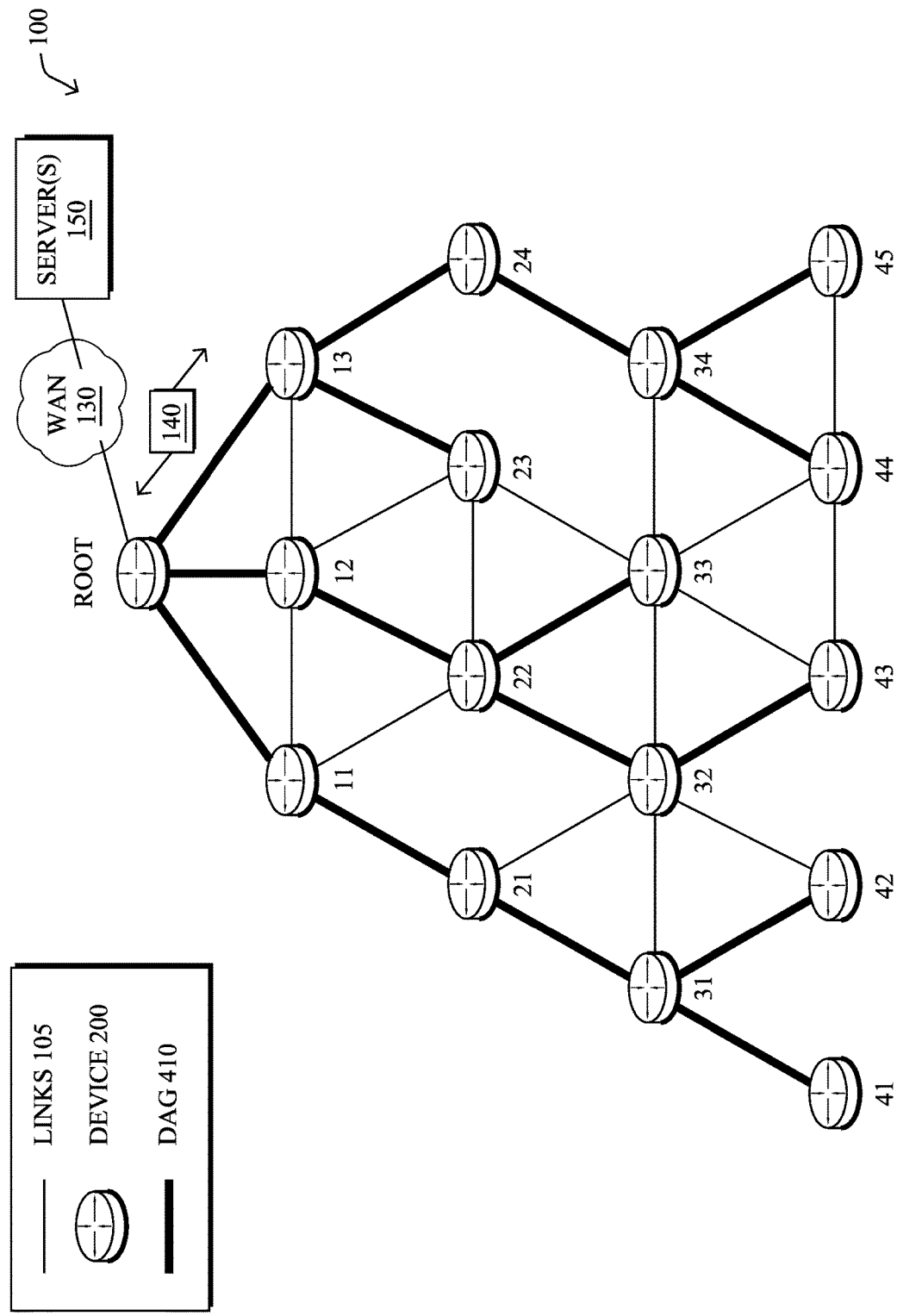
FIG. 4 illustrates an example directed acyclic graph (DAG) in the communication network of FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

In general, Information Centric Networking (ICN) is a relatively new concept in which data is independent of location, application, storage, and means of transportation, by leveraging in-network caching and replication. Such an approach may lead to improved efficiency, better scalability with respect to information/bandwidth demand, and better robustness in challenging communication scenarios. Considering the hierarchical nature of many LLN/IoT systems, ICN architectures could enable a more flexible, heterogeneous, and potentially fault-tolerant approach to storage providing persistence at multiple levels.

As noted above, however, various challenges exist with respect to LLNs due to the various constrains of the nodes in terms of power, computing cycles, storage, memory, lossy links, and the like. These challenges add to the complexity when attempting to deploy ICN over LLNs. More specifically, a key aspect of ICN is in-network caching and replication. However, many LLN nodes may not be able to devote any of their already limited resources for purposes of ICN caching. Thus, a mechanism that identifies where to cache ICN data in an LLN may be a prerequisite for implementing ICN in an LLN.

Integrating Information Centric Networking (ICN) over Low Power and Lossy Networks (LLNs)

The techniques herein allow for the deployment of ICN in an LLN by identifying LLN nodes that are able to cache ICN data. In some aspects, the techniques herein construct a sub-DAG among the identified caching nodes over which the member nodes may exchange their caching capabilities. In addition, the LLN nodes may exchange pointers to the cached ICN data over the sub-DAG in support of an INTEREST/DATA exchange.

Illustratively, the techniques described herein may be performed by hardware, software, and/or firmware, such as in accordance with process 248, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols, such as various routing protocols (e.g., RPL), and as such, may be processed by similar components understood in the art that execute those protocols, accordingly.

Specifically, according to various embodiments, a device in a network joins an Information Centric Networking (ICN)-based directed acyclic graph (DAG) based on the device being able to act as an ICN cache in the network. The device receives ICN content data for forwarding between a content provider node in the network and a destination node in the network. The device forwards the ICN content data towards the destination node in the network. The device coordinates, with one or more other members of the ICN-based DAG, caching of the ICN content data by the device or by one of other members of the ICN-based DAG.

Figure 5A:
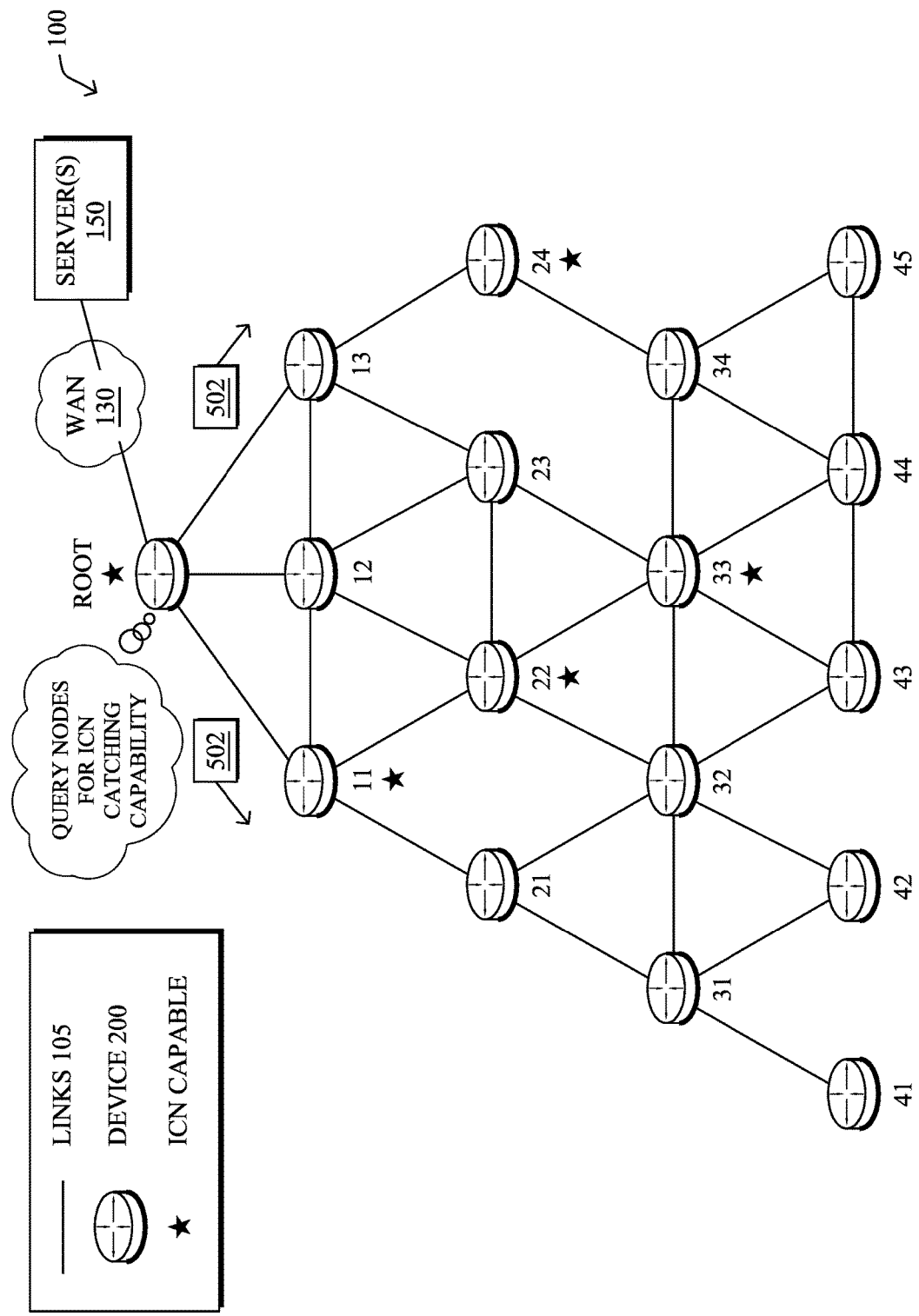
FIGS. 5A-5D illustrates an example of the formation of an Information Centric Networking (ICN)-based DAG.

Referring now to FIGS. 5A-5D, an example is shown of the formation of an ICN-based DAG in an LLN, according to various embodiments. As shown in FIG. 5A, the Root device/node may initiate formation of an ICN-based DAG by querying the devices/nodes in network 100 for their capabilities to act as an ICN cache, by sending out query messages 502. In general, a device in network 100 is able to act as an ICN cache if the device has a predefined threshold amount of available resources (e.g., storage, processing power, etc.) required for ICN caching operations. Because of the constrained nature of many LLN devices, not every device in the network may be eligible to act as an ICN cache. For purposes of illustration only, as shown, assume that only the Root node and nodes 11, 22, 24, and 33 have sufficient resources available to act as ICN caches.

In some embodiments, query messages 502 may be customized routing protocol messages. For example, query messages 502 may be RPL DIO messages that include a custom TLV via which the devices can indicate their ability to act as an ICN cache, such as a custom "C" flag ("Cache flag"). Thus, in response to receiving a message 502, the receiving device may determine whether the receiving device is able to act as an ICN cache and set the "C" flag appropriately based on this determination, before propagating the DIO messages downward.

In some cases, the ability of a given node to act as an ICN cache may be part of the objective function used for purposes of parent selection. For example, a given child may select a DAG parent based on whether the potential parent can act as an ICN cache, the link quality metrics with the potential parent, the number of hops to the Root via the parent, and/or other such factors. In other words, the child node may select its DAG parent based in part on whether the parent indicated in the DIO message that the parent can act as an ICN cache.

Figure 5B:
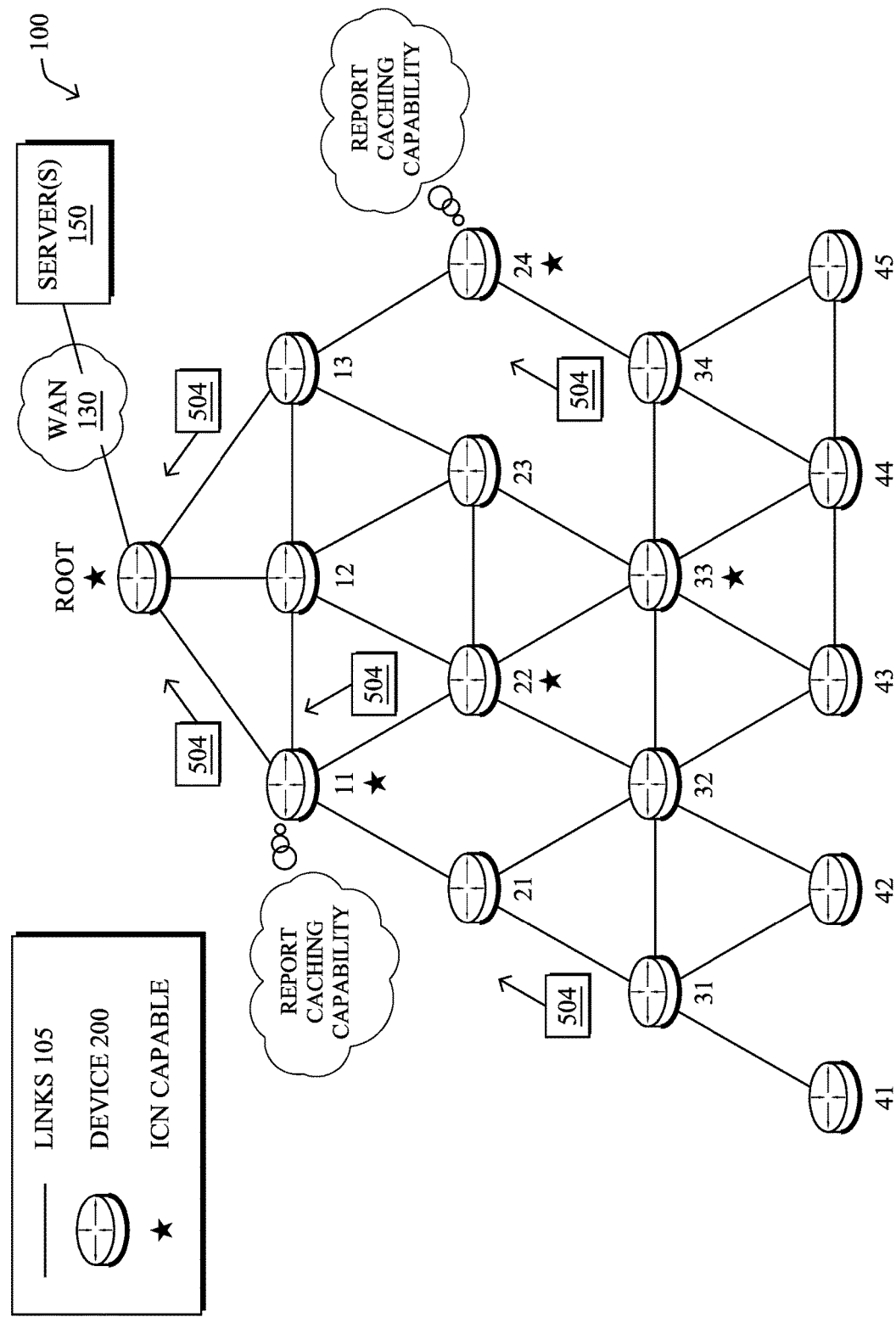

As shown in FIG. 5B, the devices/nodes in network 100 may report their ICN caching capabilities to the Root via messages 504. For example, in one embodiment, messages 504 may be unicast DAO messages sent back towards the Root and include information regarding which devices/nodes are capable of acting as ICN caches in network 100. Based on this received information, the Root may maintain a database of all ICN caching devices/nodes in network 100 (e.g., nodes 11, 22, 24, and 33).

Figure 5C:
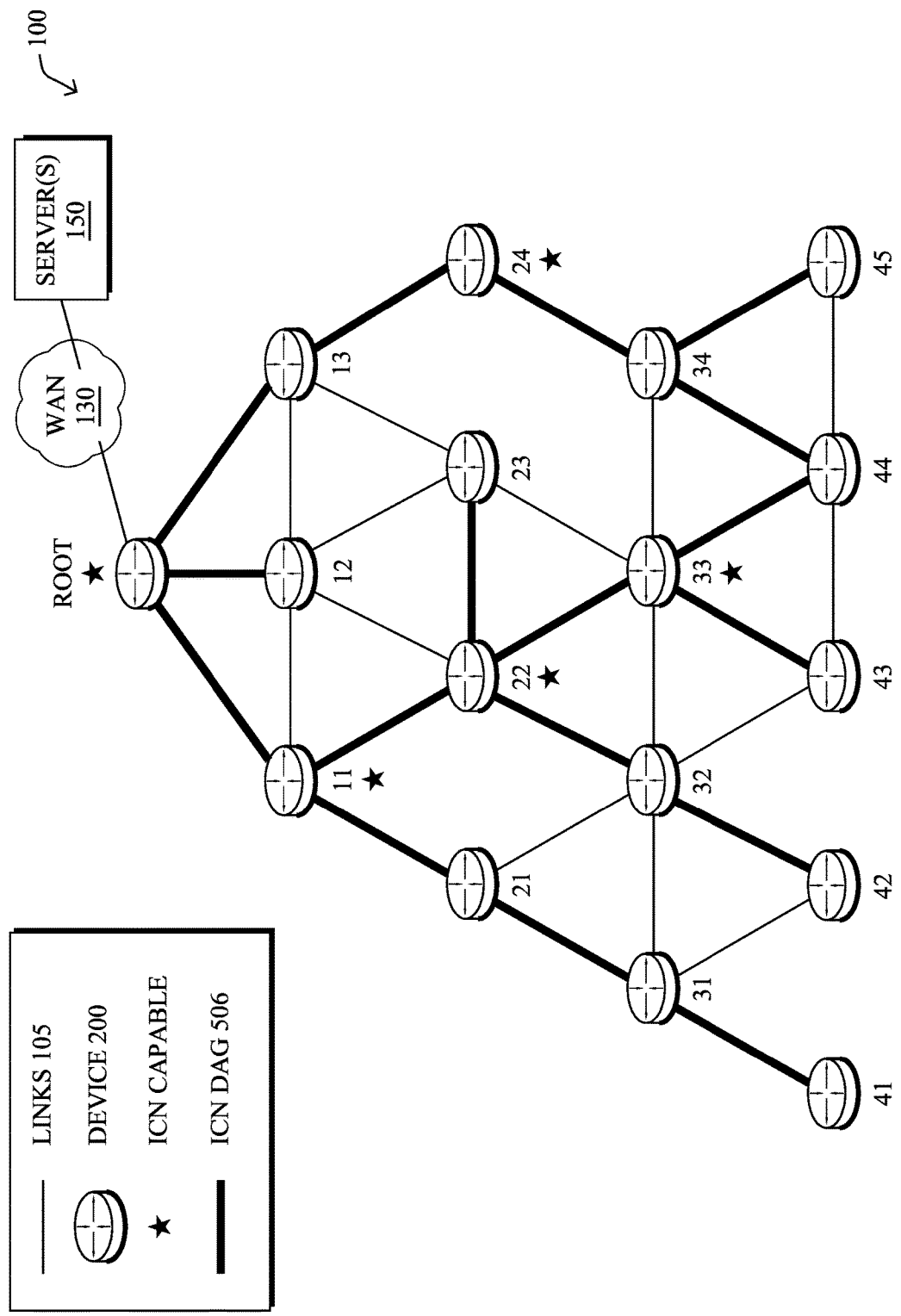

In FIG. 5C, as a result of the messaging depicted in FIGS. 5A-5B, an ICN-based DAG 506 may be formed in network 100. In various embodiments, ICN-based DAG 506 may include only the nodes capable of acting as ICN caches, the ICN caching nodes plus any intermediary nodes needed for forwarding (e.g., if two ICN caching nodes are situated such that direct communication between one another is not possible), and/or may include all nodes in network 100 such that the ICN caching nodes are located as "hubs" within ICN-based DAG 506 (e.g., via the parent selection process). ICN-based DAG 506 may also be rooted at the Root node, which is assume to be a stable node in network 100 and may be expected to cache all content to a connected data store, either locally or via another stable network (e.g., WAN 130).

Figure 5D:
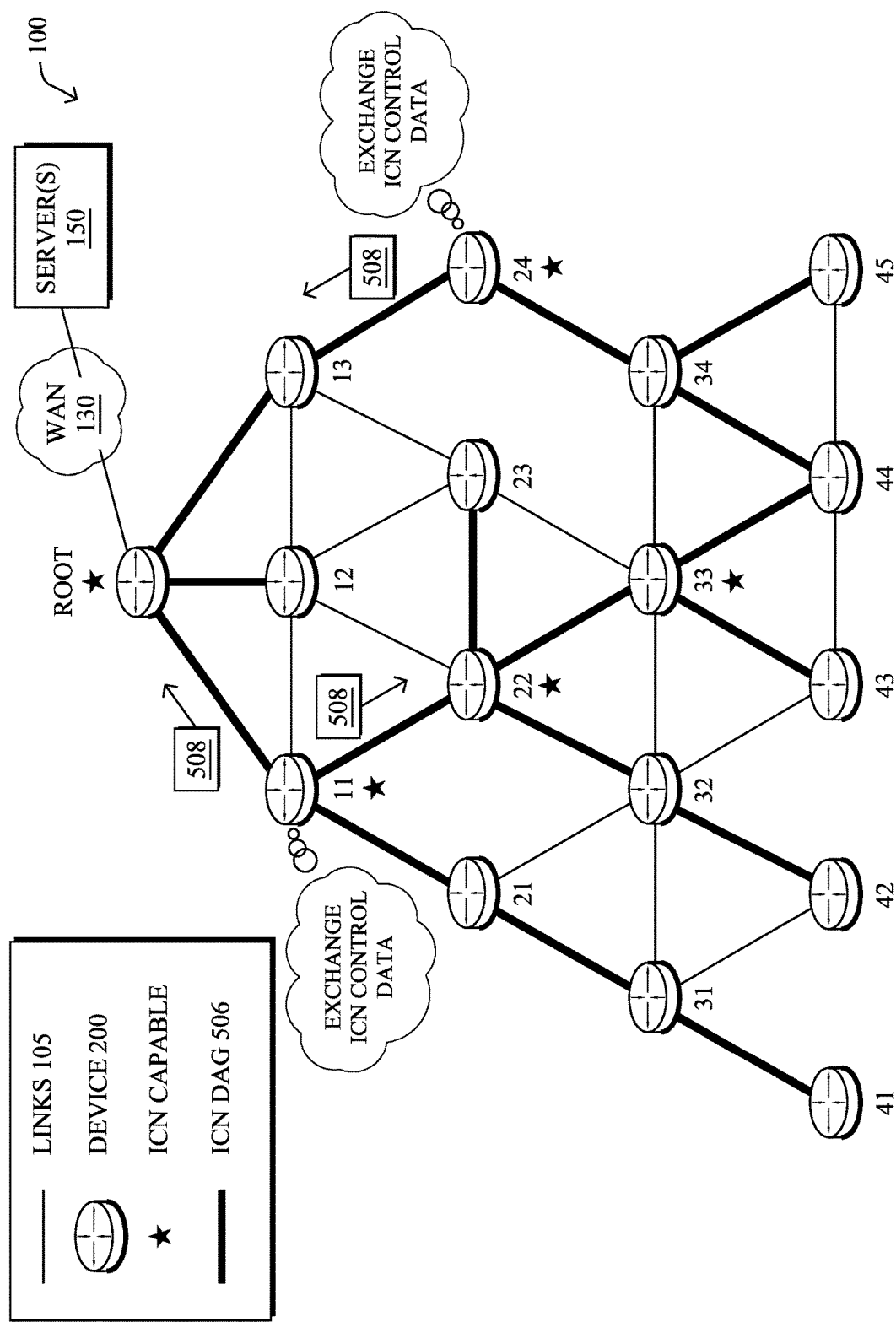

As shown in FIG. 5D, ICN-based DAG 506 may be used by the ICN cache devices to exchange ICN control data 508, in various embodiments. For example, ICN control data 508 may include, but is not limited to, data related to Interest aggregation, hashing mechanism (e.g., to store specific ICN content at a particular ICN cache), the cache clearing mechanisms in use by the ICN caching nodes (e.g., (FIFO, LRU, LUV, LFU, etc.), combinations thereof, or the like. Optionally, control data 508 may also include ICN caching table information that indicates the name and location of a particular piece of cached ICN content. An example of such a caching table is shown below:

TABLE 1

| Content | DAG ID | Node Address/ID |
|---|---|---|
| www.xyz.test/doc.txt | 19 | 11 |
| www.abc.test/rpl.png | 19 | 22 |

Thus, any or all of the ICN caching nodes may have knowledge of which member of ICN-based DAG 506 is caching a particular piece of ICN content data.

In further cases, each ICN cache may employ a threshold on the amount of ICN content that it can cache at any given time. Once crossed, the node may no longer cache new ICN content data until the old and unused content data is cleared from its local cache (e.g., by employing a predefined cache clearing mechanism). Additionally, the node may notify the other ICN caching nodes in ICN DAG 506 of its change of state via ICN control messages 508.

Additionally, ICN control messages 508 may be used by the Root node (or one of server 150) to provide supervisory control over the ICN caching nodes. For example, the Root node may instruct node 11 to switch from a First-In-First-Out (FIFO) cache clearing mechanism to a Least Recently Used (LRU) mechanism, Least Unified Value (LUV) mechanism, Least Frequently Used (LFU) mechanism, etc. Further, the Root node may periodically reform the ICN-based DAG (e.g., by issuing new DIO messages), to account for changes in network 100 (e.g., environmental changes, node movement, etc.).

As would be appreciated, ICN deployments typically leverage Name Based Routing (NBR) or its variants. Configuring NBR over an LLN is not straightforward, as care must be taken in view of the nodal constraints. ICN information can be carried over RPL or another routing protocol in two different ways. RPL using IPv6 (ICMPv6) can be leveraged for this by introducing a new IPv6 Options field. Another option could be to carry ICN information header information in the IP payload of the packet. Both these approaches have their own pros and cons. For example, if an intermediate node is a legacy node that is not configured to use ICN, it may simply forward the packet by looking at the IP destination address. If the ICN information header is carried in the IP Option, a potential requirement may be for such a legacy router to not drop IP packets carrying unidentified IP options. However, a disadvantage of carrying the ICN information header in the IP payload is that when IP packets gets fragmented, the IP fragments may lose the ICN information header. Thus, a tradeoff between these approaches has to be decided while deploying the techniques herein.

Figure 6A:
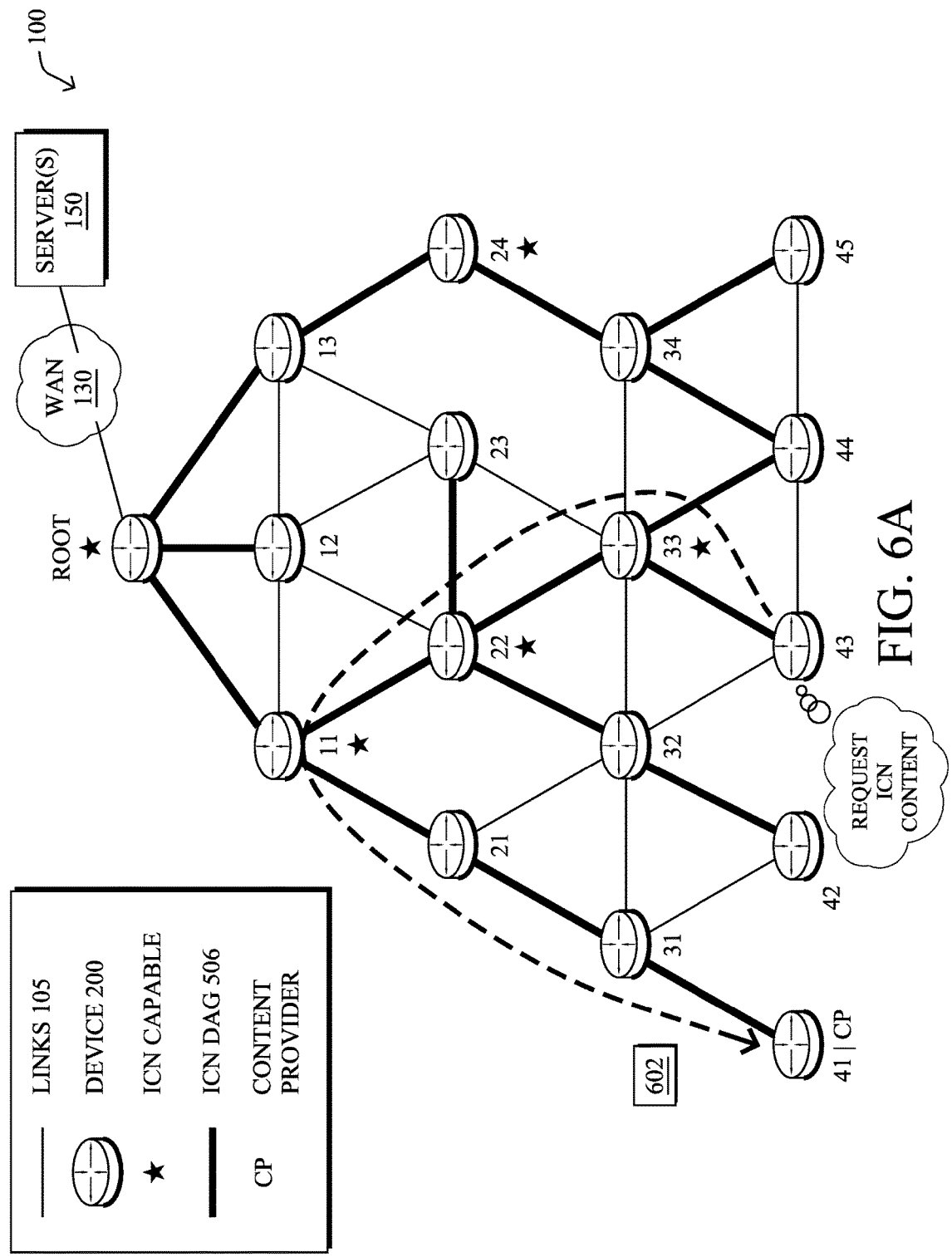
FIGS. 6A-6F illustrate using ICN caching in a network.
Figure 6B:
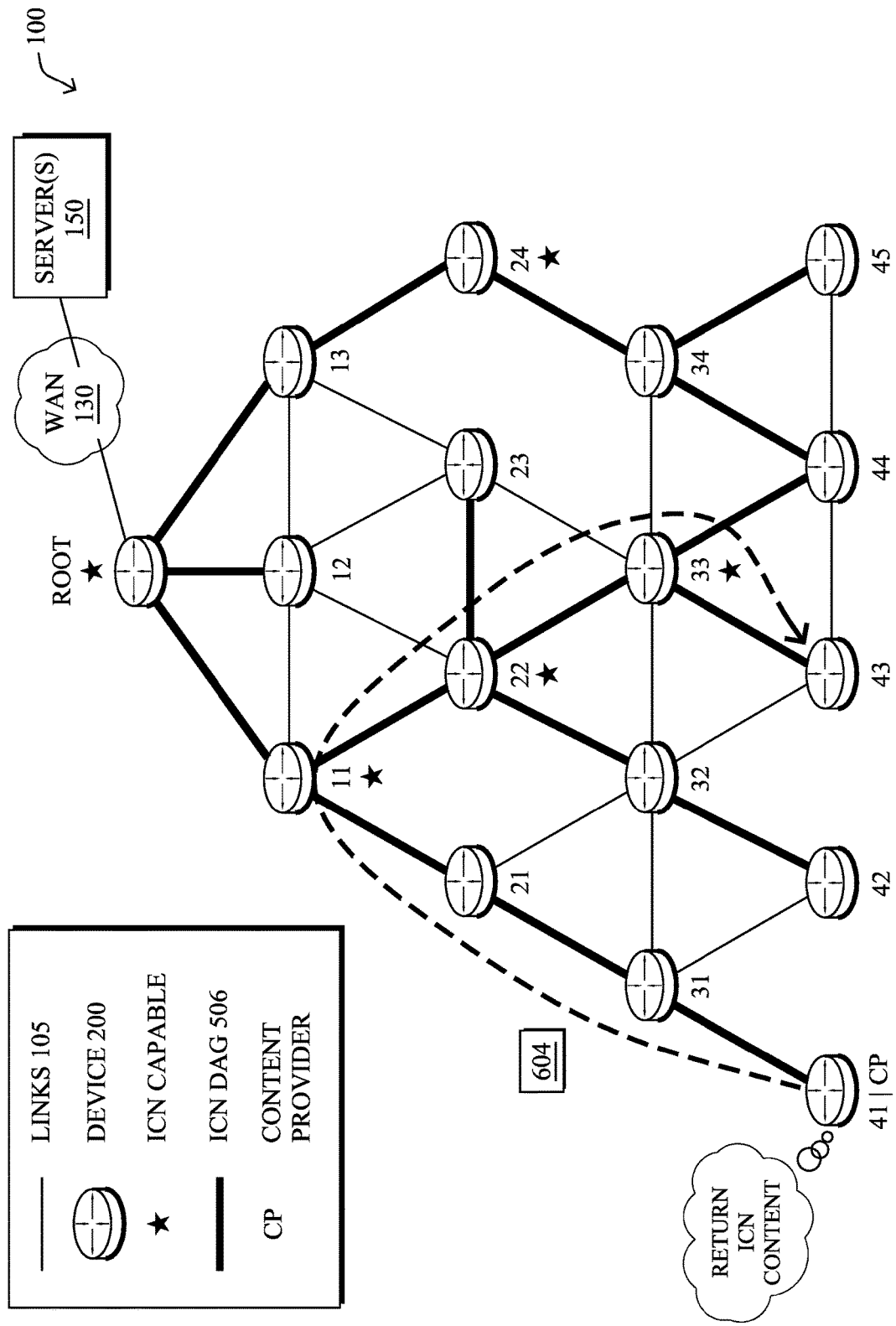

FIGS. 6A-6F illustrate using ICN caching in network 100, according to various embodiments. As shown in FIG. 6A, assume that node 43 initiates an ICN INTEREST message 602 for content from a content provider node 41 or another node attached thereto. INTEREST message 602 may propagate upward in DAG 506 or via another DAG in use (e.g., up to the ROOT) and then back down until arriving at content provider node 41 As shown in FIG. 6B, provider node 41 may then return the requested content via a message 604 to the requesting node 43.

In some embodiments, any ICN caching node along the path traversed by content message 604 may cache a copy of the content data. For example, in response to receiving message 604, node 11 may forward message 604 on towards its destination node 44 and make a copy of the content at this time.

Various mechanisms are possible to coordinate the caching of the content in message 604 by the ICN caching nodes. In some embodiments, a caching node may indicate in the forwarded content message that the node has cached the content. For example, node 11 may extend the data packet(s) of message 604 to include a cached flag that can be used to indicate that the content has been cached by node 11. In turn, any other ICN caching nodes along the communication path to destination node 44 may use the set flag in message 604 to control whether the cache node will also cache the content. For example, the ICN caching nodes may use the cache flag in message 604 to prevent redundantly caching the content at multiple nodes (e.g., the first caching node to encounter message 604 caches the content).

Figure 6C:
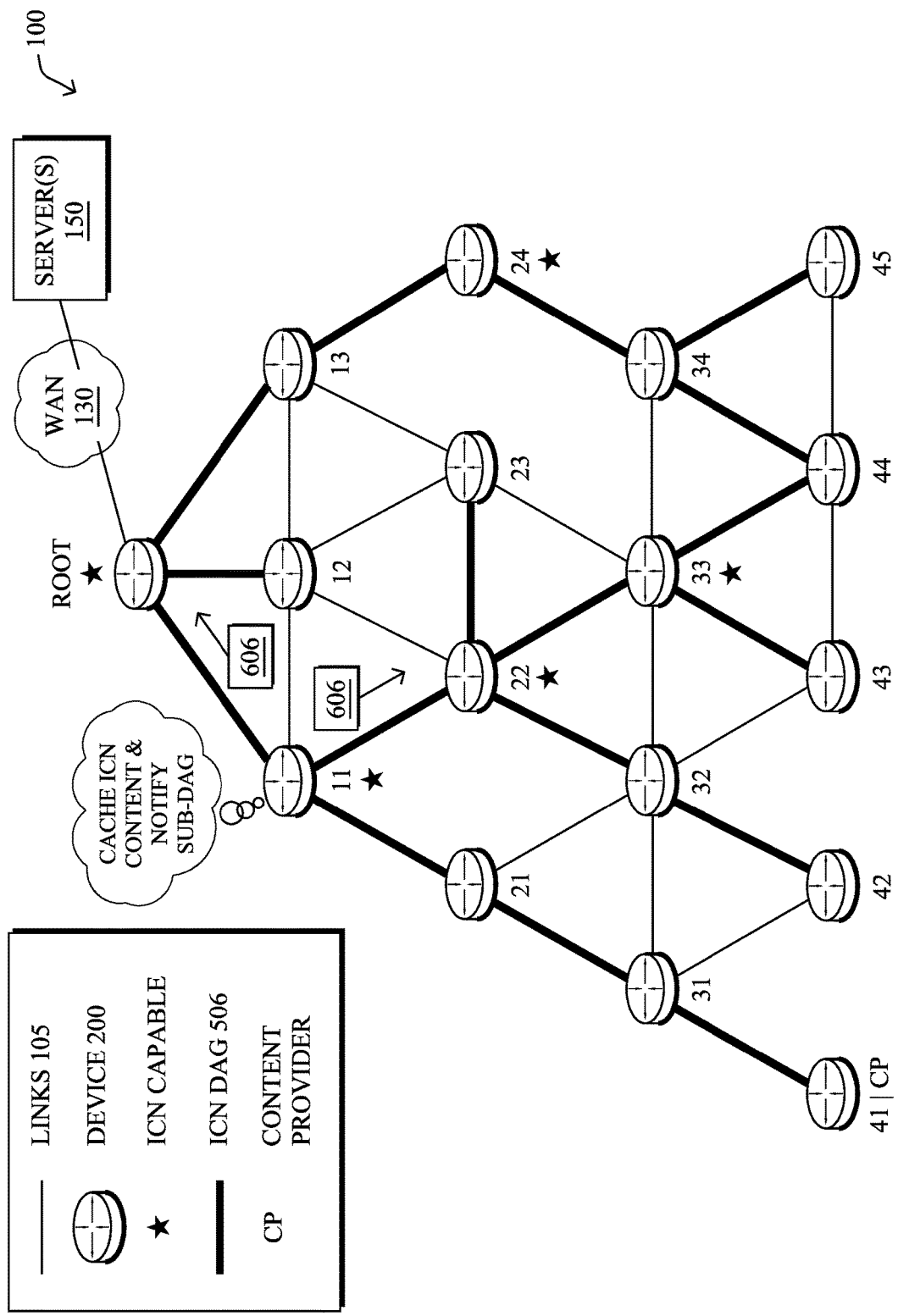

As shown in FIG. 6C, another possible way to coordinate ICN caching may be for the caching node(s) to notify the other ICN caching nodes in DAG 506 of the cached content via message(s) 606. For example, after caching the content of message 604, node 11 may share its caching table with the other member caching nodes of DAG 506. Any other caching node that also cached the content of message 604 may also send out messages 606, to coordinate the final caching location for the content and remove any redundantly cached copies in network 100. For example, if nodes 22 and 33 also cached the content of message 604, they may remove their locally cached copies after coordinating with node 11.

Figure 6D:
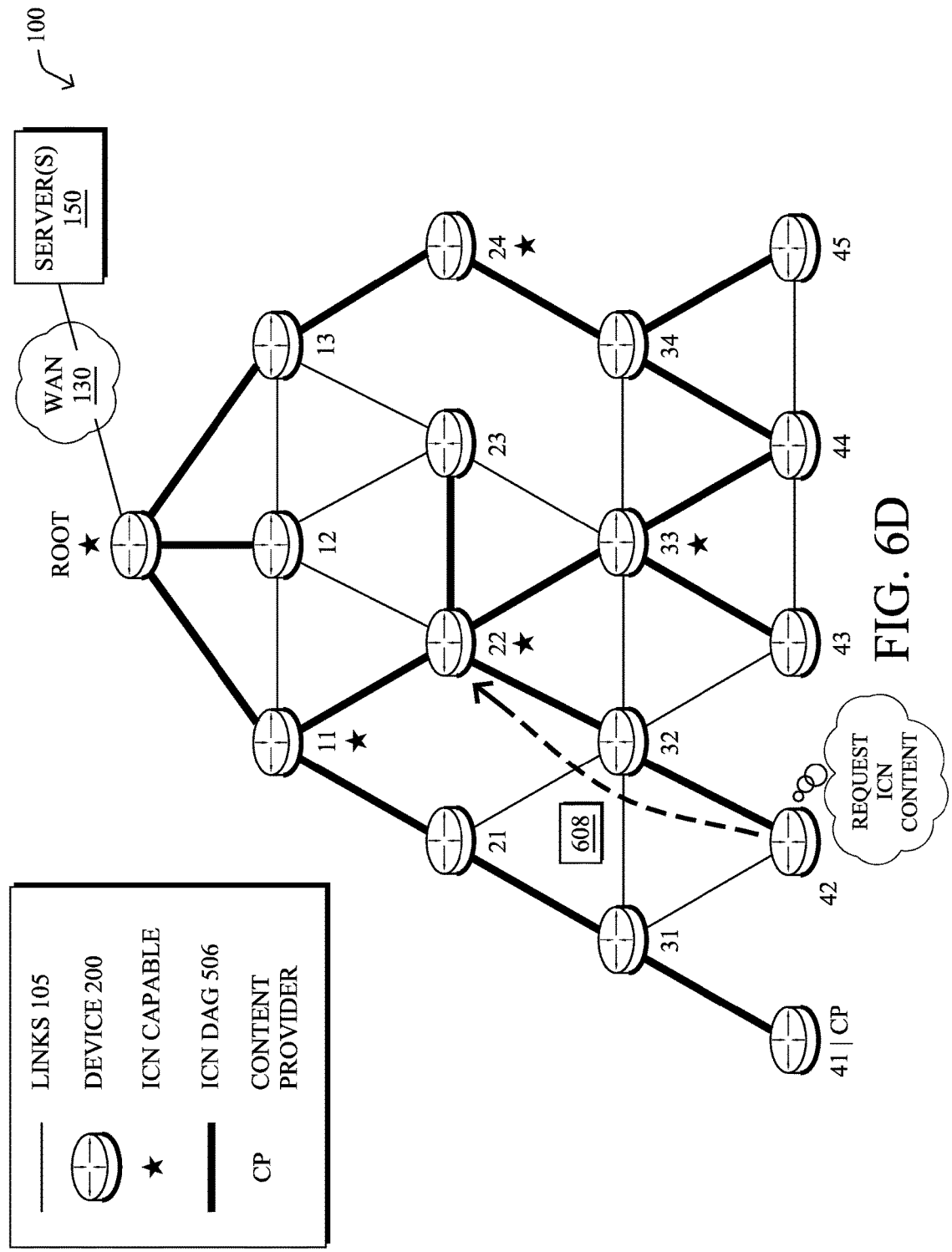

In FIG. 6D, assume that node 42 later issues an INTEREST message 608 for the same content that was previously cached by node 11 and forwarded to node 43 from content provider node 41. By sharing caching table information among the ICN caching nodes, the caching nodes in DAG 506 will know the caching location of the content in network 100.

Figure 6E:
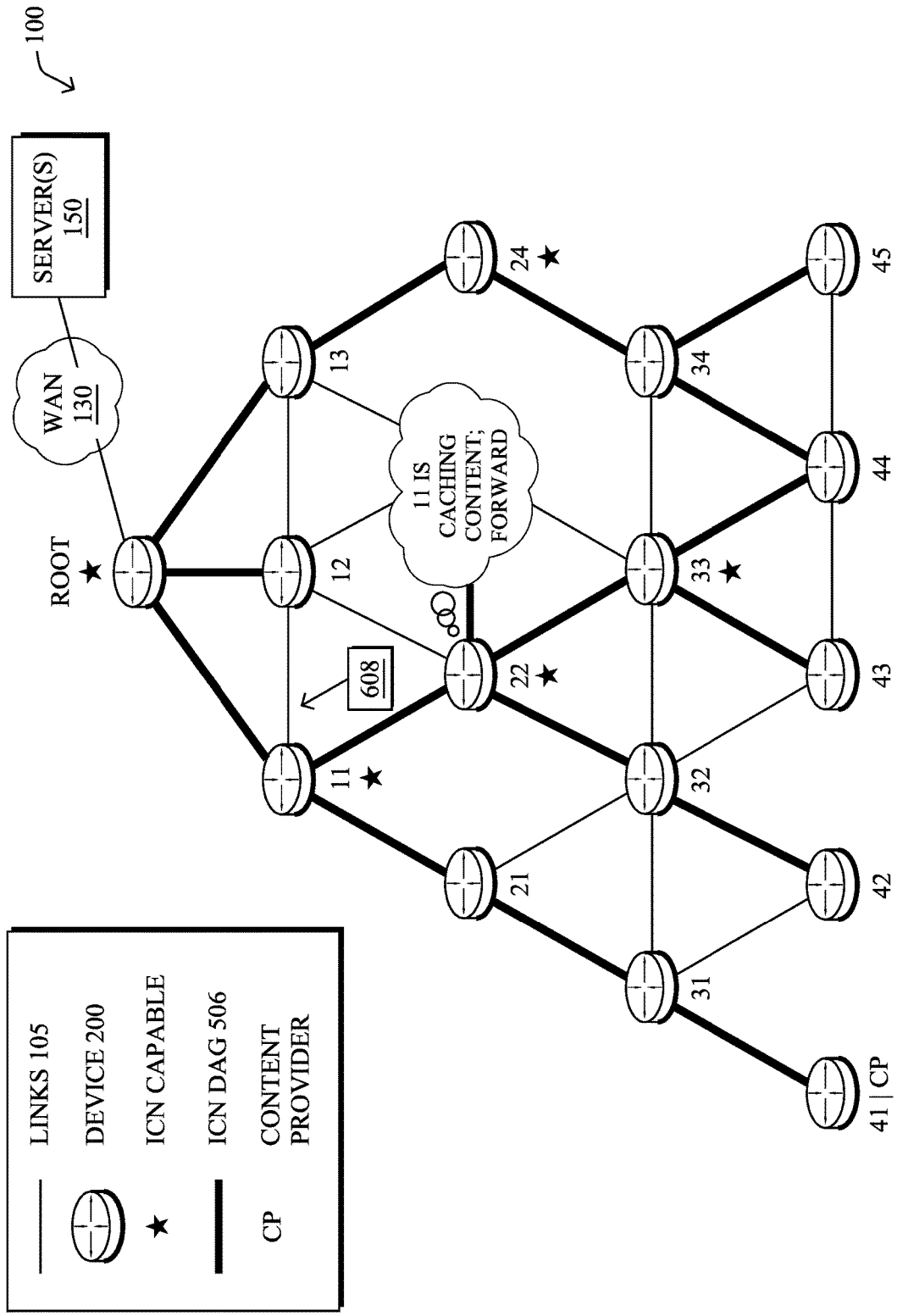

Thus, as shown in FIG. 6E, when node 22 receives INTEREST message 608, it may compare the requested content to its caching table and determine that the content is being cached by node 11. In turn, node 22 may forward INTEREST message 608 on to node 11 for processing. In some embodiments, the caching node handling an INTEREST message request may determine whether sending the request on to the ICN cache location is more costly than to the original content provider. If so, it may instead opt to send the request on to the content provider. Alternatively, or in addition thereto, the ICN caching nodes may make a similar determination when coordinating the caching location (e.g., to select the most beneficial location, etc.).

Figure 6F:
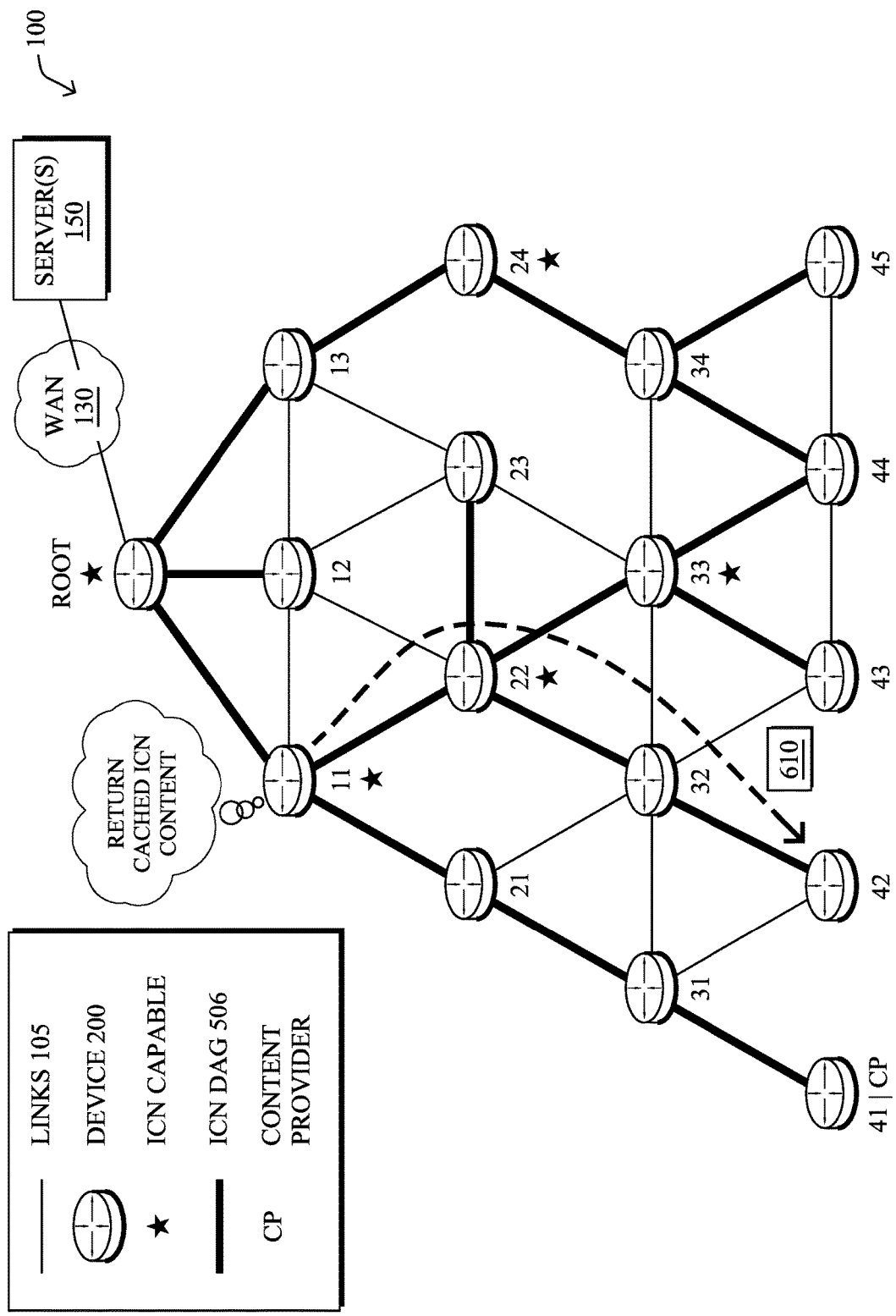

As shown in FIG. 6F, in response to receiving INTEREST message 608, node 11 may retrieve the corresponding ICN content from its local cache by matching the requested content to its cached content. In turn, node 11 may generate a content message 610 and send message 610 on towards the requesting node 42. Thus, if caching node 11 has a local copy of the requested content, it may simply return the content to the requestor rather than forwarding the request on to the content provider.

Figure 7:
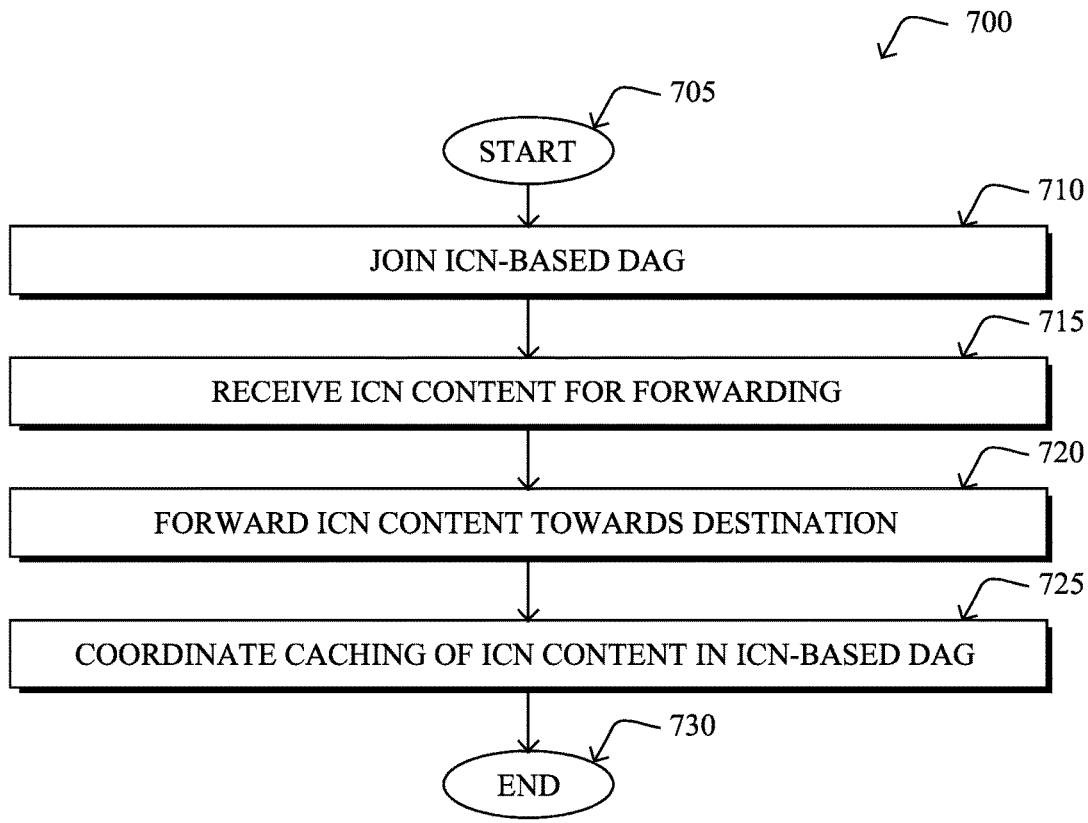
FIG. 7 illustrates an example simplified procedure for coordinating caching of ICN content in an ICN-based DAG.

FIG. 7 illustrates an example simplified procedure for coordinating caching of ICN content in an ICN-based DAG, in accordance with one or more embodiments described herein. For example, a non-generic, specifically configured device (e.g., device 200) may perform procedure 700 by executing stored instructions (e.g., process 248). The procedure 700 may start at step 705, and continues to step 710, where, as described in greater detail above, the device may join an ICN-based DAG based on the device being able to act as an ICN cache in the network. Notably, in many LLNs and other constrained networks, many devices/nodes may not have sufficient resources or capabilities to act as an ICN cache.

At step 715, as detailed above, the device may receive ICN content for forwarding from a content provider node in the network to a destination node in the network. In other words, the device may be an intermediary node along a communication path between the content provider node and the destination node.

At step 720, the device may forward the ICN content on towards the destination device, as described in greater detail above. In some cases, if the device also caches the content, it may include an indication in the forwarded content message that it has done so. For example, the device may set a cached flag in the message, to alert any downstream nodes that the content has already been cached.

At step 725, as detailed above, the device may coordinate with one or more other members of the ICN-based DAG caching of the ICN content. Notably, the content may be cached either at the device itself or by one or more other ICN caching nodes in the ICN-based DAG. In some cases, the coordination may entail marking the forwarded content message to indicate that the device has cached the content. By doing so, other caching nodes along the communication path may, e.g., elect not to also cache the content. In further embodiments, the device may coordinate the caching by sharing its caching table with the one or more other DAG members. In doing so, this allows the device and the other member(s) to determine where the content is currently cached and where the content should be cached in the DAG. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the implementation of ICN within LLNs and other constrained networks. In some aspects, the ICN caching capabilities of the nodes may be included as an objective function constraint (e.g., in RPL or another routing protocol), to construct an ICN-based DAG. Such a DAG may then be used by the ICN caching nodes to exchange their caching details. Doing so may also prevent redundant caching, which is of particular importance in constrained environments. Further, the techniques herein substantially improve the overall performance of the nodes/network and decrease the cache-miss, while also improving the overall lifetime of the network due to low power usage at the nodes while searching for the stored content in the network.

While there have been shown and described illustrative embodiments that provide for implementing ICN in an LLN, it is to be understood that various other adaptations and modifications may be made within the spirit and scope of the embodiments herein. For example, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, by a device in a network, a query message from a root node in the DAG, wherein the query message queries whether the device is able to act as an Information Centric Networking (ICN) caching node in the network;
in response to receiving the query message, transmit, by the device, a response message to the root node, wherein the response message indicates the device is capable of caching ICN data;
joining, by the device, an ICN-based DAG based on the device being able to cache ICN data in the network, wherein the ICN DAG is a sub-DAG that includes each of the devices able to cache ICN data;
receiving, at the device, ICN content data for forwarding between a content provider node in the network and a destination node in the network;
forwarding, by the device, the ICN content data towards the destination node in the network; and
coordinating, by the device and with one or more other members of the ICN-based DAG, caching of the ICN content data by the device or by one of other members of the ICN-based DAG, wherein coordinating includes:
causing, by the device, another member of the ICN-based DAG to cache the ICN content data, in response to determining that sufficient resources are not available on the device to cache the ICN content data.

2. The method as in claim 1, wherein the network is a low-power and lossy network (LLN).

3. The method as in claim 1, further comprising:
caching, by the device, the ICN content data; and
providing, by the device, the cached ICN content data, in response to receiving a request for the ICN content data addressed to the content provider node.

4. The method as in claim 1, further comprising: in response to receiving the query message, determining, by the device, whether the device has sufficient resources to cache ICN data; and
in response to determining by the device that the device has sufficient resources to cache ICN data, indicating in the query message the device is capable of caching ICN data.

5. The method as in claim 4, wherein the routing protocol message is a Routing Protocol for Low Power and Lossy Networks (RPL) Destination Oriented DAG Information Object (DIO) message.

6. The method as in claim 4, wherein the routing protocol message further indicates an ICN cache strategy to be used in the ICN-based DAG.

7. The method as in claim 1, wherein coordinating caching of the ICN content data with the one or more other devices in the ICN-based DAG comprises:
exchanging, by the device, caching table information with one or more other members of the ICN-based DAG, wherein the caching table information indicates a caching location of the ICN content data in the ICN-based DAG.

8. The method as in claim 1, further comprising:
receiving, at the device, a request for the ICN content data for forwarding to the content provider node; and, in response,
forwarding, by the device, the request to one of the members of the ICN-based DAG that caches the ICN content data.

9. An apparatus, comprising:
one or more network interfaces to communicate with a network via a directed acyclic graph (DAG);
a processor coupled to the network interfaces and configured to execute one or more processes; and
a memory configured to store a process executable by the processor, the process when executed operable to:
receive a query message from a root node in the DAG, wherein the query message queries whether the apparatus is able to act as an Information Centric Networking (ICN) caching node in the network;
in response to receiving the query message, transmit a response message to the root node, wherein the response message indicates the apparatus is capable of caching ICN data;
join an ICN-based DAG based on the device being able to cache ICN data in the network, wherein the ICN DAG is a sub-DAG that includes each of the devices able to cache ICN data;
receive ICN content data for forwarding between a content provider node in the network and a destination node in the network;
forward the ICN content data towards the destination node in the network; and
coordinate, with one or more other members of the ICN-based DAG, caching of the ICN content data by the device or by one of other members of the ICN-based DAG, wherein the apparatus coordinates caching of the ICN content data with the one or more other devices in the ICN-based DAG by:
causing another member of the ICN-based DAG to cache the ICN content data, in response to determining that an sufficient resources are not available on the apparatus to cache the ICN content data.

10. The apparatus as in claim 9, wherein the network is a low-power and lossy network (LLN).

11. The apparatus as in claim 9, wherein the process when executed is further operable to:
cache the ICN content data; and
provide the cached ICN content data, in response to receiving a request for the ICN content data addressed to the content provider node.

12. The apparatus as in claim 9, wherein the process when executed is further operable to: in response to receiving the query message, determine whether the device has sufficient resources to cache ICN data; and
in response to determining by the device that the device has sufficient resources to cache ICN data, indicate in the query message the device is capable of caching ICN data.

13. The method as in claim 12, wherein the routing protocol message is a Routing Protocol for Low Power and Lossy Networks (RPL) Destination Oriented DAG Information Object (DIO) message.

14. The apparatus as in claim 12, wherein the routing protocol message further indicates an ICN cache strategy to be used in the ICN-based DAG.

15. The apparatus as in claim 9, wherein the apparatus coordinates caching of the ICN content data with the one or more other devices in the ICN-based DAG by:
    exchanging caching table information with one or more other members of the ICN-based DAG, wherein the caching table information indicates a caching location of the ICN content data in the ICN-based DAG.

16. The apparatus as in claim 9, wherein the process when executed is further operable to:
    receive a request for the ICN content data for forwarding to the content provider node; and, in response,
    forward the request to one of the members of the ICN-based DAG that caches the ICN content data.

17. A tangible, non-transitory, computer-readable medium storing program instructions that cause a device in a network to execute a process comprising:
    receiving, by a device in a network, a query message from a root node in the DAG, wherein the query message queries whether the device is able to act as an Information Centric Networking (ICN) caching node in the network;
    in response to receiving the query message, transmit, by the device, a response message to the root node, wherein the response message indicates the device is capable of caching ICN data;
    joining, by the device, an ICN-based DAG based on the device being able to cache ICN data in the network, wherein the ICN DAG is a sub-DAG that includes each of the devices able to cache ICN data;
    receiving, at the device, ICN content data for forwarding between a content provider node in the network and a destination node in the network;
    forwarding, by the device, the ICN content data towards the destination node in the network; and
    coordinating, by the device and with one or more other members of the ICN-based DAG, caching of the ICN content data by the device or by one of other members of the ICN-based DAG, wherein coordinating includes:
        causing, by the device, another member of the ICN-based DAG to cache the ICN content data, in response to determining that sufficient resources are not available on the device to cache the ICN content data.

18. The computer-readable medium as in claim 17, wherein the process further comprises: in response to receiving the query message, determining whether the device has sufficient resources to cache ICN data; and
    in response to determining that the device has sufficient resources to cache ICN data, indicating in the query message the device is capable of caching ICN data.

* * * * *

UNITED STATES PATENT AND TRADEMARK OFFICE
CERTIFICATE OF CORRECTION

PATENT NO.         : 10,425,485 B2
APPLICATION NO.    : 15/357043
DATED              : September 24, 2019
INVENTOR(S)        : Ganesh Prasad Narayan Palankar It is certified that error appears in the above-identified patent and that said Letters Patent is hereby corrected as shown below:

In the Specification

Column 4, Line 58, please amend as shown:
nects are characterized by, illustratively, high loss rates, Signed and Sealed this
Eleventh Day of February, 2020

Andrei Iancu
*Director of the United States Patent and Trademark Office*